(12) United States Patent
Bang (10) Patent No.: US 9,197,737 B2
(45) Date of Patent: Nov. 24, 2015

(54) MOBILE TERMINAL AND VIBRATION POWER CONTROL METHOD THEROF

(75) Inventor: Sungeun Bang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 13/523,744

(22) Filed: Jun. 14, 2012

(65) Prior Publication Data

US 2013/0021276 A1    Jan. 24, 2013

(30) Foreign Application Priority Data

Jul. 22, 2011    (KR) ........................ 10-2011-0073304

(51) Int. Cl.
*H04M 1/725*    (2006.01)
*G06F 3/01*    (2006.01)
*H04M 19/04*    (2006.01)

(52) U.S. Cl.
CPC ............ *H04M 1/72563* (2013.01); *G06F 3/016* (2013.01); *H04M 1/72569* (2013.01); *H04M 19/047* (2013.01)

(58) Field of Classification Search
CPC ............. G06F 3/016; G06F 2203/014; H04M 1/72519; H04M 1/72522; H04M 1/72563; H04M 1/72569
USPC ............. 700/280; 340/407.2; 455/567, 575.2, 455/575.1; 318/114
See application file for complete search history.

(56) References Cited

U.S. PATENT DOCUMENTS

| 6,100,654 | A | * | 8/2000 | Izukawa et al. | ............... | 318/114 |
| 7,006,641 | B1 | * | 2/2006 | Saiki et al. | ...................... | 381/98 |
| 8,059,088 | B2 | * | 11/2011 | Eid et al. | ........................ | 345/156 |
| 8,306,576 | B2 | * | 11/2012 | Cho et al. | ....................... | 455/567 |
| 2005/0085275 | A1 | | 4/2005 | Hugunin | | |
| 2008/0268874 | A1 | | 10/2008 | Pizzi | | |

(Continued)

FOREIGN PATENT DOCUMENTS

| CN | 101373414 | 2/2009 |
| CN | 101681200 | 3/2010 |
| CN | 102111496 | 6/2011 |

(Continued)

OTHER PUBLICATIONS

European Patent Office Application Serial No. 12177038.2, Search Report dated Oct. 29, 2012, 7 pages.

(Continued)

*Primary Examiner* — Quan-Zhen Wang
*Assistant Examiner* — Xuemei Zheng
(74) *Attorney, Agent, or Firm* — Lee, Hong, Degerman, Kang & Waimey (57) ABSTRACT

The present disclosure relates to a mobile terminal capable of providing optimal vibration power through sweeping of vibration frequencies, and a vibration power control method thereof. When a specific touch is detected after setting frequency sweep information in form of a table in a memory, at least one sweep frequency is swept at a preset period within a vibration frequency range exhibiting satisfactory vibration power using the frequency sweep information so as to drive a vibration motor, thereby maintaining vibration power always in an optimal state. Also, a driving voltage of the vibration motor may be dropped to reduce battery consumption while driving the vibration motor, and the sweep frequency range and the sweep period can be adaptively changed according to a type of application displayed on a screen to stably maintain vibration power irrespective of a change in an application.

8 Claims, 9 Drawing Sheets

(56) References Cited

U.S. PATENT DOCUMENTS

2012/0038582 A1* 2/2012 Grant .......................... 345/174
2013/0201010 A1* 8/2013 Fadell et al. ............... 340/407.2

FOREIGN PATENT DOCUMENTS

EP          1505550 A1 * 2/2005 ............... G08B 6/00
EP          1716935         11/2006

OTHER PUBLICATIONS

The State Intellectual Property Office of the People's Republic of China Application Serial No. 201210244176.2, Office Action dated Dec. 17, 2013, 7 pages.

* cited by examiner

VIBRATION FREQUENCY SWEEPING BETWEEN
222Hz~226Hz AT PERIOD OF 25ms

FIG. 5

ABOUT 8-TIME VIBRATION FREQUENCY
SWEEPING AT PERIOD OF 20ms

FIG. 6A

GENERATION OF GOOD VIBRATION POWER BETWEEN 223Hz AND 226Hz

FIG. 6B

GENERATION OF GOOD VIBRATION POWER BETWEEN 223Hz AND 225Hz

MOBILE TERMINAL AND VIBRATION POWER CONTROL METHOD THEROF

CROSS-REFERENCE TO RELATED APPLICATION

Pursuant to 35 U.S.C. §119(a), this application claims the benefit of earlier filing date and right of priority to Korean Application No. 10-2011-0073304, filed on Jul. 22, 2011, the contents of which is incorporated by reference herein in its entirety.

BACKGROUND OF THE INVENTION

1. Field of the Invention

This specification relates to a mobile terminal capable of optimizing vibration in response to a touch input through a vibration frequency sweeping and vibration power control method thereof.

2. Background of the Invention

Mobile terminals may be configured to perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement.

Among others, a touch function of the mobile terminal is designed for a user unfamiliar to button/key input using a touch screen to conveniently execute operations of the mobile terminal. In recent time, the touch function is becoming an important function of the terminal together with a user interface (UI), in addition to a simple input function. Hence, as the touch function is further applied to the mobile terminal in various forms, development of appropriate UIs is more needed.

In general, the mobile terminal generates vibration using a vibration motor. Examples of vibration motors being used include a coin type motor, a brush type motor, a linear type motor, a pan type motor and the like. Among others, the linear motor has an advantage in view of reaching a maximum vibration (power) within a short time at a specific fixed frequency as compared to other vibration motors, so it is built in the mobile terminal for use.

However, similar to other vibration motors, the linear motor uses the fixed operational frequency, so it has disadvantages of increasing an overlap amount or improving vibration only by a mechanical supplementation. That is, a damper (or double-sided tape) has been attached onto upper and lower portions of the linear motor (i.e., the mechanical supplementation) or the damper has been more closely adhered onto the linear motor to improve the vibration by increasing a horizontal vibration effect more than a longitudinal vibration effect (i.e., the change in the overlap amount).

Consequently, since the mechanical supplementation and/or the adjustment of the overlap amount are fixed at the moment of fabricating mobile terminals, the mobile terminals exhibit slight difference of vibration power unless those mobile terminals are completely the same as each other. As a result, when a user purchases a mobile terminal having the linear motor, whether the corresponding mobile terminal exhibits good vibration or not depends on chance, and there is no proper way to change the bad vibration by software configuration. Hence, the related art mobile terminal has a problem that it cannot guarantee stable vibration for a user according to a characteristic of a single product (i.e., individual mobile terminal).

Also, for the related art mobile terminal having the linear motor, in order to ensure a constant vibration, a driving voltage of the linear motor should always be increased more than a specific level. The increase in the driving voltage causes a battery lifespan to be reduced.

SUMMARY OF THE INVENTION

Therefore, an aspect of the detailed description is to provide a mobile terminal capable of stably maintaining vibration of a vibration motor irrespective of a characteristic of a single product, and a vibration power control method thereof.

Another aspect of the detailed description is to provide a mobile terminal capable of providing an optimal vibration effect through sweeping of vibration frequencies, and a vibration power control method thereof.

Another aspect of the detailed description is to provide a mobile terminal capable of reducing battery consumption by dropping a driving voltage of a vibration motor upon sweeping vibration frequencies, and a vibration power control method thereof.

To achieve these and other advantages and in accordance with the purpose of this specification, as embodied and broadly described herein, there is provided a vibration power control method for a mobile terminal including setting frequency sweep information, deciding at least one sweep frequency using the frequency sweep information when a touch is detected on a specific screen, and driving a vibration motor by sweeping the decided at least one sweep frequency at a preset period.

The vibration motor may include a coin motor, a brush motor, a linear motor and a pan motor.

The frequency sweep information may include a sweep frequency range, a sweep period, a sweep time, the number of sweep frequencies and a sweep pattern.

The sweep frequency range may indicate a range of vibration frequencies, at which the vibration motor exhibits maximum vibration power when a vibration frequency of the vibration motor is sequentially increased.

The at least one sweep frequency may be decided by dividing the sweep frequency range by the number of sweep frequencies included in the frequency sweep information.

The frequency sweep information may be automatically decided based on a pre-stored table according to a type of vibration motor when a frequency sweep item is activated in a vibration motor menu.

The frequency sweep information may be decided in an individual setting menu according to a type of vibration motor and a user selection when the pre-stored table is not present at the moment that the frequency sweep item is activated in the vibration motor menu. Here, the sweep frequency range may be automatically decided and provided based on a fixed frequency set during fabrication.

The sweep frequencies may be swept in the order of frequency sizes or vibration intensities or in an alternating manner.

The method may further include dropping a driving voltage of the vibration motor by a preset level while the vibration motor is driven by sweeping the sweep frequencies.

The method may further include detecting a change in a screen, identifying a type of application executed on the changed screen, and automatically changing the frequency sweep information according to the identified type of application.

To achieve these and other advantages and in accordance with the purpose of this specification, as embodied and broadly described herein, there is provided a mobile terminal including a memory to store frequency sweep information, a display unit to display a specific application screen, and a controller to decide at least one sweep frequency using the frequency sweep information stored in the memory when a touch is detected on the screen, and drive a vibration motor by sweeping the decided at least one sweep frequency at a preset period.

The vibration motor may include a coin motor, a brush motor, a linear motor and a pan motor.

The frequency sweep information may include a sweep frequency range, a sweep period, a sweep time, the number of sweep frequencies and a sweep pattern.

The sweep frequency range may indicate a range of vibration frequencies, at which the vibration motor exhibits maximum vibration power when a vibration frequency of the vibration motor is sequentially increased.

The controller may decide at least one sweep frequency by dividing the sweep frequency range by the number of sweep frequencies included in the frequency sweep information.

The controller may automatically decide the frequency sweep information based on a pre-stored table according to a type of the vibration motor when a frequency sweep item is activated in a vibration motor menu.

The frequency sweep information may be decided in an individual setting menu according to a type of vibration motor and a user selection when the pre-stored table is not present, and the sweep frequency range may automatically be set and provided based on a fixed frequency set during fabrication.

The controller may sweep the sweep frequencies in the order of frequency sizes or vibration intensities or in an alternating manner.

The controller may drop a driving voltage of the vibration motor by a preset level when the vibration motor is driven by sweeping the sweep frequency.

The controller may automatically change the frequency sweep information according to a type of application when the corresponding application displayed on the screen is changed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
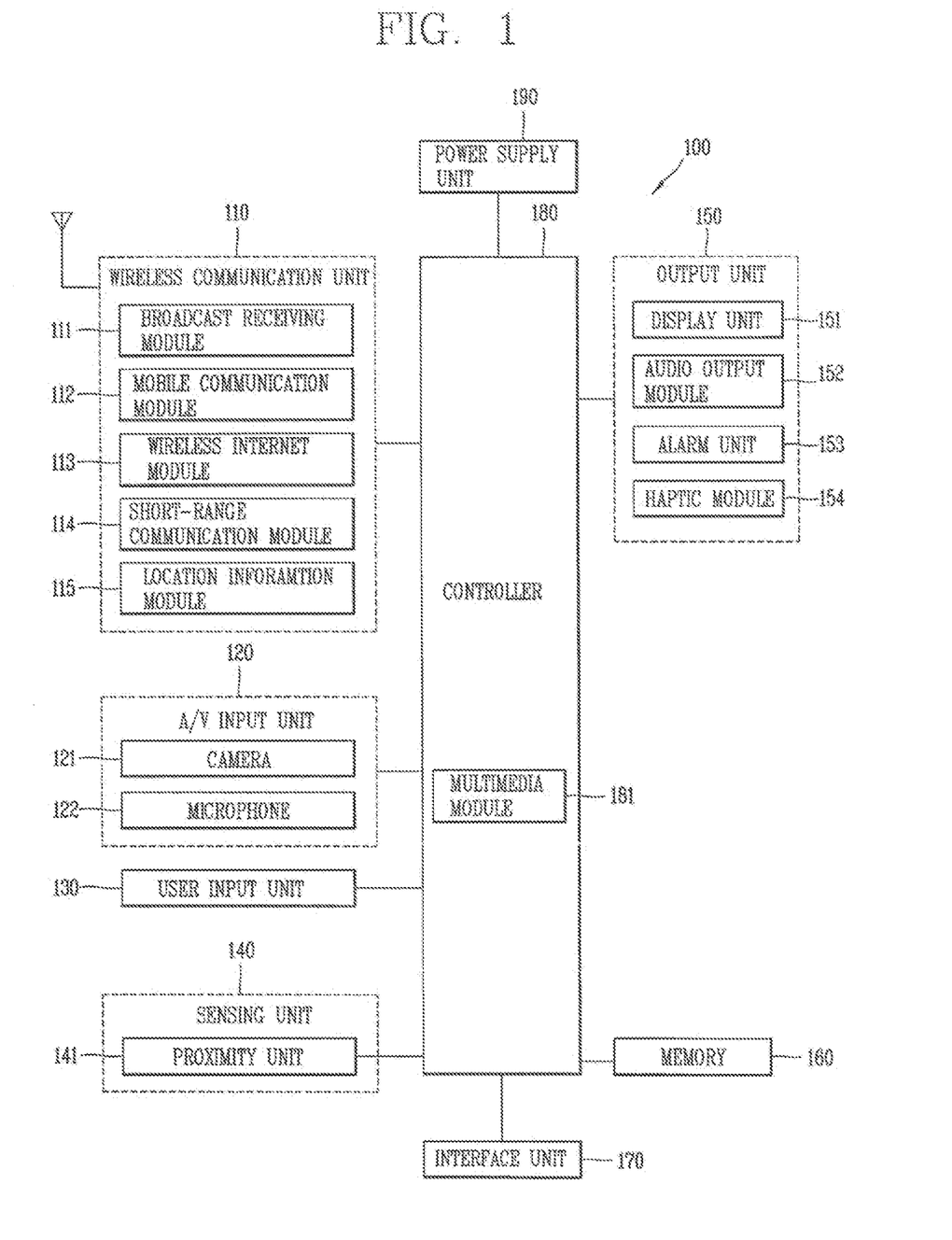
FIG. 1 is a block diagram of a mobile terminal in accordance with one exemplary embodiment of this specification.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The NV input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141. The user touches may include touch, touch & drag, multi-touch, long touch, and proximity touch. Also, the sensing unit 140 may include a geomagnetic sensor to calculate a movement distance when a user moves, a gyro sensor to calculate a rotating direction, and an acceleration sensor.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call signal received, message received, key signal input, touch input and the like. In addition to generating the audio or video signal, the alarm 153 may also inform the event generation in different manners. The video or audio signal may be outputted via the display 151 or the audio output module 152. Hence, those components 151, 153 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As aforesaid, the mobile terminal has been described in the aspect of its components according to functions. Hereinafter, for brief description, among various types of mobile terminals, such as a folder type, a bar type, a swing type, a slider type and the like, a slider type mobile terminal will be exemplarily described. Therefore, this specification may not be limited to the slider type mobile terminal but applicable to any type of mobile terminal including the above types.

The mobile terminal 100 shown in FIG. 1 may be configured to operate within a communication system, which allows data transmission via frames or packets. Such communication systems may include a wired/wireless communication system and a satellite-based communication system.

Hereinafter, description will be given of a communication system operable with the mobile terminal, with reference to FIG. 2.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 2:
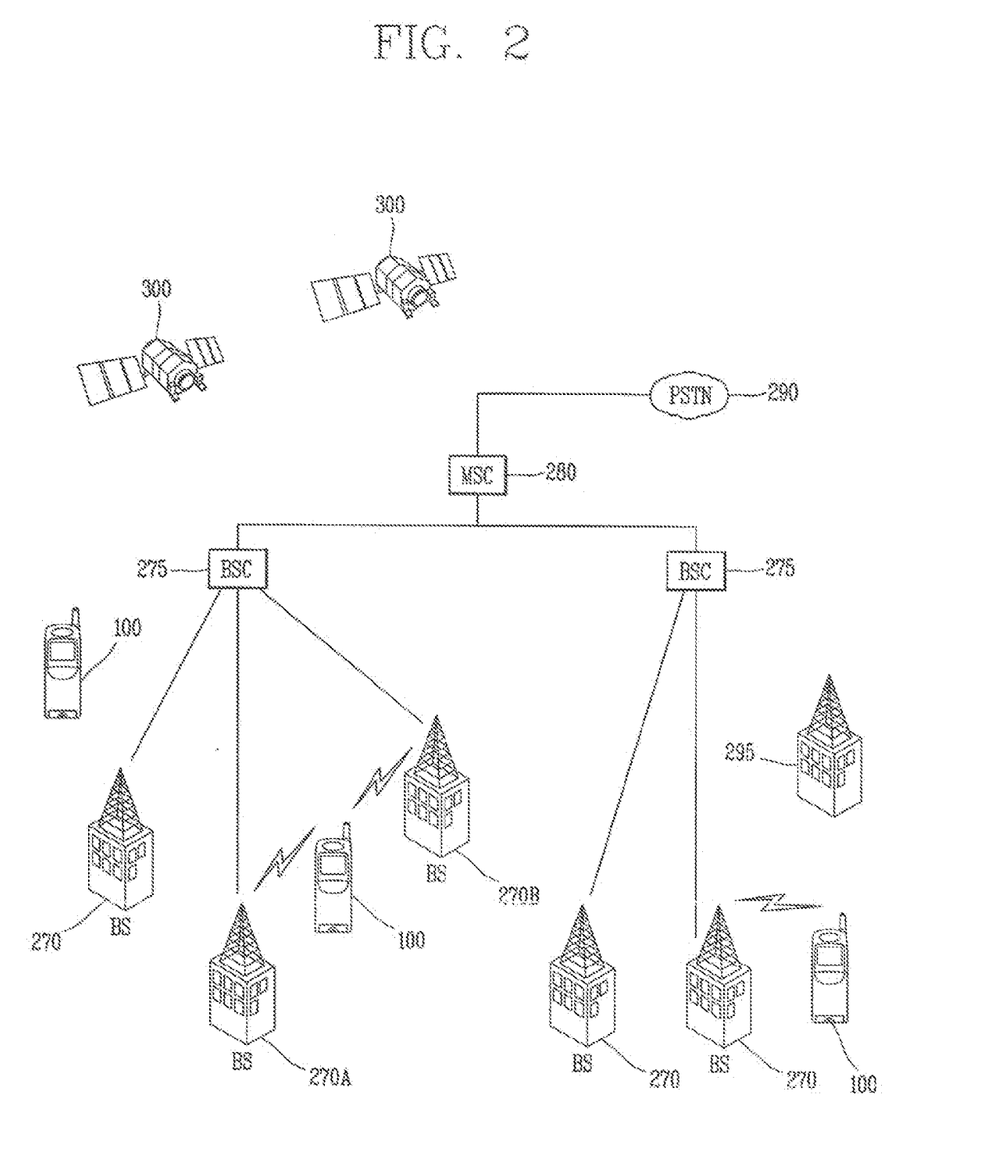
FIG. 2 is a block diagram of a wireless communication system operable with the mobile terminal.

Referring now to FIG. 2, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

The present disclosure provides a method by which a user can always stably feel satisfactory vibration, irrespective of a characteristic of a single product, on the basis of recognition of an idea that a characteristic of vibration of a vibration motor depends on an operational frequency. That is, the present disclosure allows a consumer to recognize the moment when an optimal vibration is felt by sweeping a vibration frequency at a preset period within a vibration frequency range (e.g., 224-226) exhibiting the most excellent vibration. Hereinafter, a vibration frequency within the vibration frequency range (e.g., 224-226) is defined as 'sweep frequency.'

In accordance with the present disclosure, when a touch is detected on a screen in a state that a frequency sweep information is set for a frequency sweeping of a vibration motor, the frequency sweep information is used to decide at least one sweep frequency so as to drive the vibration motor by sweeping the decided at least one sweep frequency at a preset period. Here, the at least one sweep frequency may be decided and stored prior to touch detection.

The vibration motor may be one of a coin type motor, a brush type motor, a linear motor and a pan motor. For the sake of explanation, the present invention exemplarily employs the linear motor exhibiting an excellent performance.

The frequency sweep information may include a sweep frequency range, a sweep period, a sweep time and a sweep pattern. The number of sweep frequencies may additionally be set.

The sweep frequency range indicates a range of vibration frequencies at which the vibration motor generates the maximum vibration when the vibration frequency of the vibration motor increases in a sequential manner.

An operational frequency, namely, a sweep frequency of the vibration motor indicates every operational frequency belonging to the sweep frequency range. When setting the number of sweep frequencies, the sweep frequencies may be decided by dividing the sweep frequency range by the corresponding number of sweep frequencies.

The frequency sweep information may be automatically decided based on a pre-stored table according to a type of the vibration motor when a frequency sweep item is activated in a vibration motor menu.

The frequency sweep information may be decided in an individual setting menu according to the type of vibration motor and a user selection when the pre-stored table is not present at the moment that the frequency sweep item is activated in the vibration motor menu. Here, the sweep frequency range may be provided by being automatically set based on a fixed frequency, which has been set during fabrication.

The sweep frequencies within the sweep frequency range may be swept in the order of frequency sizes or vibration intensity or in an alternating manner.

Figure 3A:
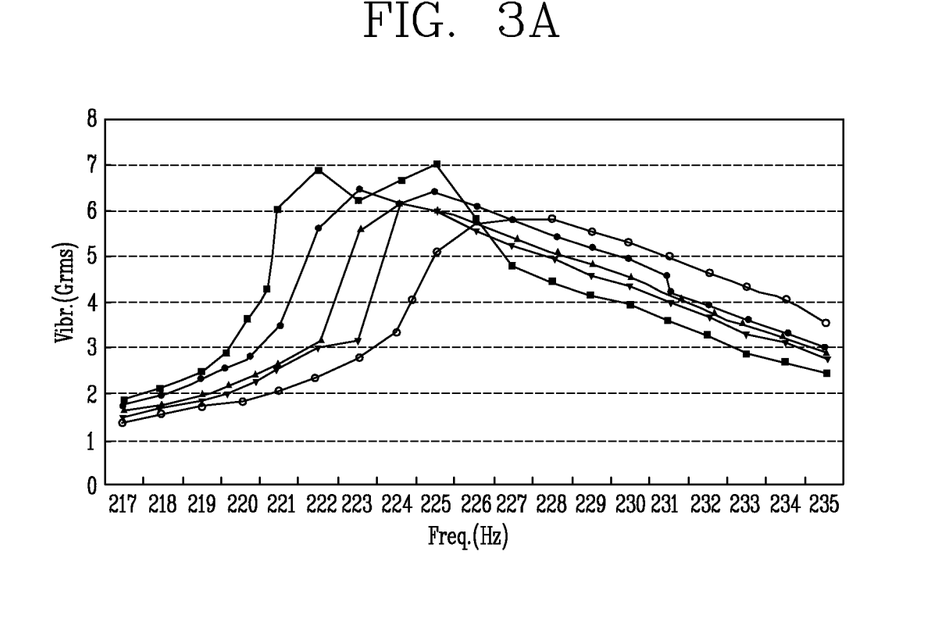
FIGS. 3A and 3B are test results showing the changes in vibration power according to operational frequencies of a mobile terminal having a vibration motor.
Figure 3B:
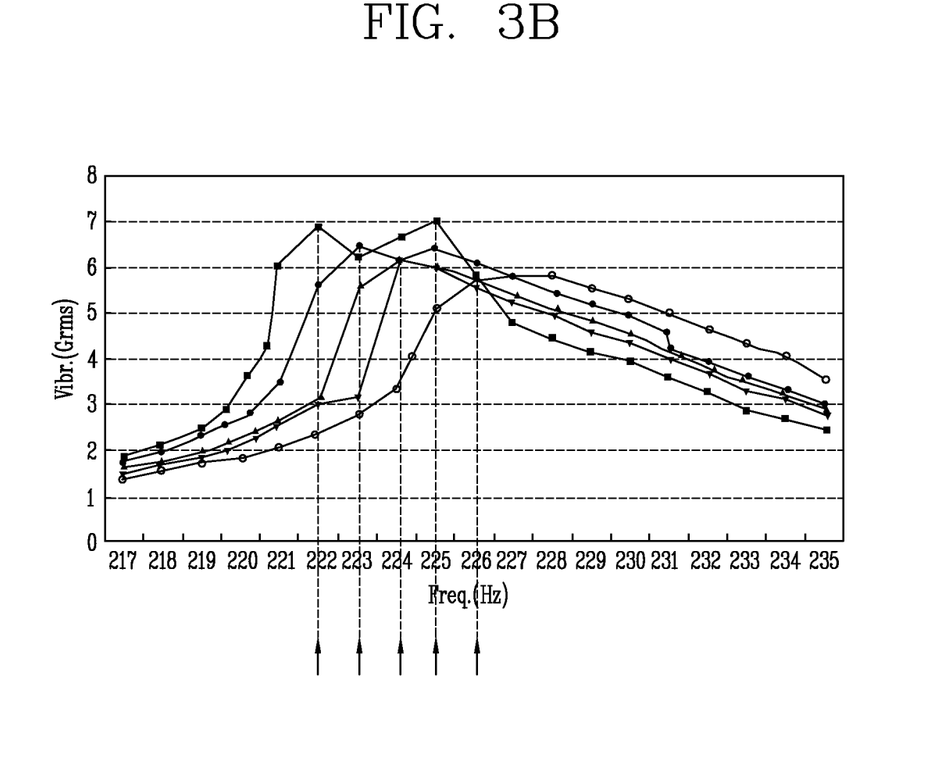

FIGS. 3A and 3B are test results showing the changes in vibration power according to operational frequencies in a mobile terminal having a vibration motor. Especially, FIG. 3A shows the changes in vibration power of a linear motor according to operational frequencies.

Also, when other types of vibration motors (e.g., a coin motor, a brush motor and a pan motor) are mounted, it may exhibit different vibration frequencies and vibration power changes. However, it has been proved by experiment that a different rising time is shown but otherwise a basic graph is similar to that in FIG. 3 even if measuring the changes in vibration power according to frequencies after mounting another type of vibration motor. For reference, the rising time indicates a time taken for vibration power to reach a maximum value starting from a minimum value. The rising time is 80~90 ms for a coin motor, 40~50 ms for a brush motor and 26~60 ms for a linear motor.

As shown in FIG. 3A, assuming that X-axis is an operational frequency and Y-axis is vibration power, it can be seen that the vibration power graph of the linear motor moves toward the right side as an operational frequency increases. However, it can be noticed that the vibration power is not increased in proportion to the operational frequency, but rather a peak (maximum point) of the vibration power is distributed within a range of 222 Hz~226 Hz.

That is, as shown in the vibration graph of FIG. 3B, the vibration power (Grms) is about 6.9 at 222 Hz, about 6.2 at 223 Hz, about 6.6 at 224 Hz, about 7.05 at 225 Hz, and about 5.8 at 226 Hz.

Hence, in the present disclosure, the frequency range, namely, 222 Hz~226 Hz, in which the peak of the vibration power according to the operational frequency of the vibration motor is appeared, is set as a range of frequencies to be swept (hereinafter, referred to as 'sweep frequency range'). The sweep frequency range may depend on a type of motor, and be set in a user menu.

Also, the present disclosure may allow for setting of a sweep period and an overall sweep time (or the number of sweeping) with respect to the set sweep frequency range. In general, when an operational frequency changes at a time interval of 80 ms, a user may recognize vibration power according to a corresponding frequency. However, if different vibration power is recognized per 80 ms, the user may feel inconvenient.

Therefore, the present disclosure may set a sweep period for the sweep frequency range to 20~30 ms, such that the user can always feel smooth vibration power even if an operational frequency changes. Here, the sweep period may be changed by a user through a menu. Especially, the sweep period may be changeable manually or automatically according to a task (e.g., mail writing, web surfing) of a mobile terminal performed by the user. As one example, when a user selects a text message writing mode requiring many number of touch inputs while performing web surfing requiring relatively small number of touch inputs, the sweep frequency range and the sweep period may change simultaneously or the sweep frequency range may remain still and the sweep period may be automatically shortened.

Figure 4:
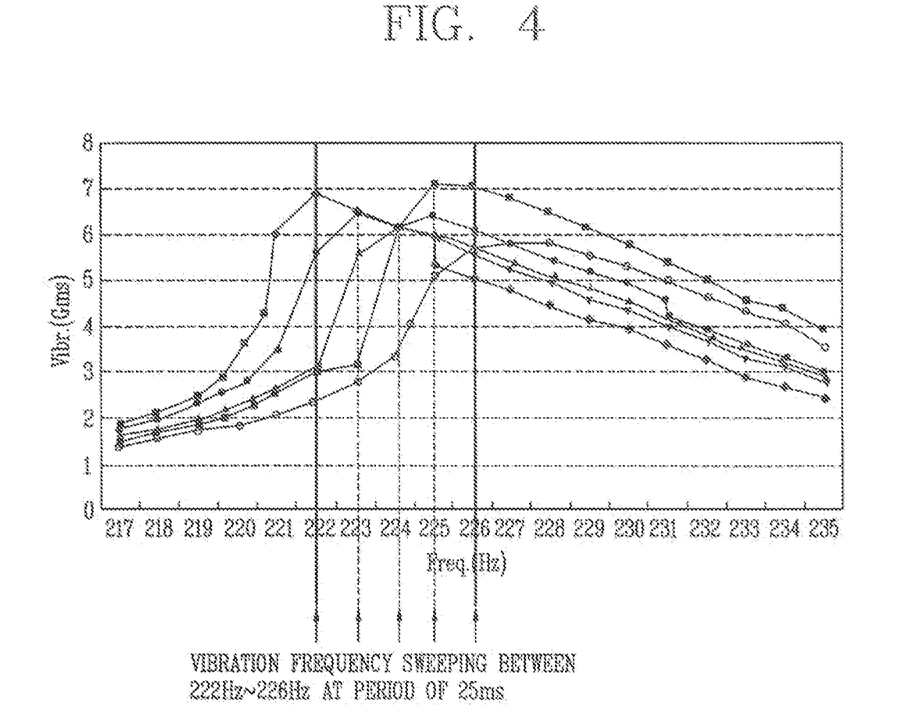
FIG. 4 is a graph showing a concept of sweeping operational frequencies of a vibration motor at a preset sweep period in accordance with an exemplary embodiment.

FIG. 4 is a graph showing a concept of sweeping operational frequencies of a vibration motor at a preset sweep period in accordance with an exemplary embodiment.

As shown in FIG. 4, the present disclosure may perform "frequency sweeping operation" of repetitively performing, for the set sweep time, an operation of sequentially increasing an operational frequency from 222 Hz to 226 Hz at a period of 25 ms and thereafter decreasing an operational frequency of the vibration motor from 226 Hz to down to 222 Hz at a period of 25 ms.

Figure 5:
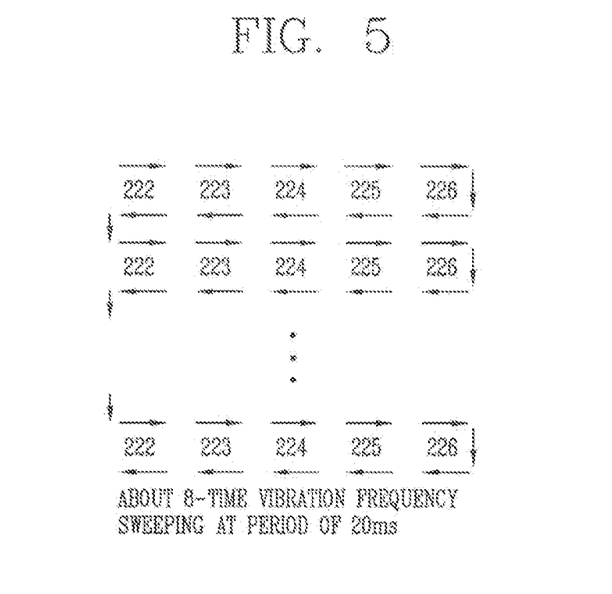
FIG. 5 is a detailed view showing a frequency sweeping operation in accordance with an exemplary embodiment.

FIG. 5 is a detailed view showing a frequency sweeping operation in accordance with an exemplary embodiment.

As shown in FIG. 5, in a state that a sweep frequency range is set to 222 Hz~226 Hz, a sweep period is set to 25 ms and a sweep time (the number of sweeping) is set to 200 ms, upon detection of a user touch input, a frequency is sequentially increased by 1 Hz from 222 Hz to 226 Hz at the period of 25 ms (i.e., 222 Hz→223 Hz→224 Hz→225 Hz→226 Hz), and then the frequency is sequentially decreased by 1 Hz from 226 Hz to 222 Hz at the period of 25 ms. This operation is repeated about eight times for 200 ms.

Accordingly, it can be noticed in the vibration graph of FIG. 4 that the probability that the user can feel good vibration power (more than 6 Grms) is increased by about 8 times (may be increased more when the sweep time is longer). Especially, in the related art, there is no problem when the vibration motor generates good vibration power at the moment of purchasing the mobile terminal. However, when the mobile terminal providing bad vibration power is purchased, since the corresponding vibration motor uses a fixed vibration frequency, an appropriate method to supplement vibration power has not been introduced.

However, the present disclosure can guarantee sufficiently stable vibration power through the frequency sweeping even if the vibration motor of the purchased mobile terminal has a bad vibration frequency.

Figure 6A:
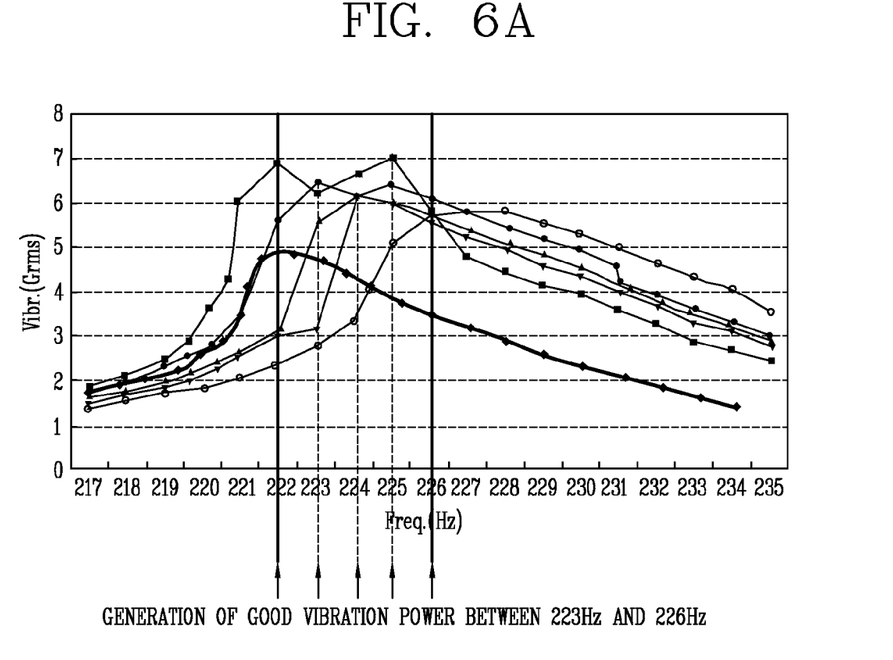
FIGS. 6A and 6B are graphs showing ideas of controlling vibration in a mobile terminal having a fixed vibration frequency according to this specification.
Figure 6B:
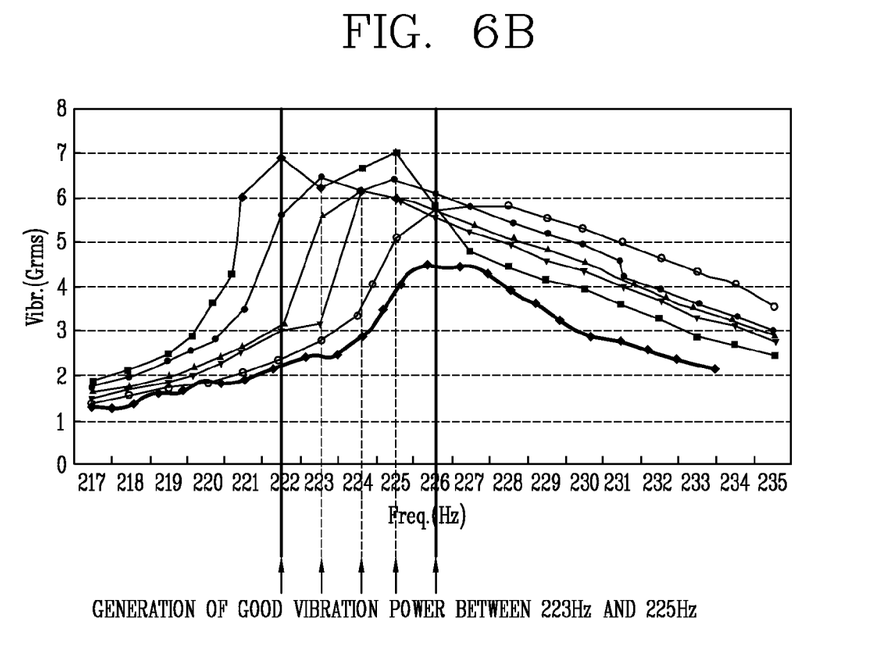

FIGS. 6A and 6B are graphs showing ideas of controlling vibration power in a mobile terminal having a fixed vibration frequency according to this specification.

As shown in FIG. 6A, even in case where vibration power of about 6.9 Grms should be generated at a vibration frequency of 222 Hz but vibration power of about 5 Grms is generated due to a matter of fabrication, vibration power of about 6.5, 6.2, 7.05 and 5.8 is generated respectively at 223 Hz, 224 Hz, 225 Hz and 226 Hz by virtue of the frequency sweeping even if the vibration power of 5 Grms is currently generated at 222 Hz. Hence, a user can always feel satisfactory vibration power.

Referring to FIG. 6B, in case where vibration power of about 5.85 Grms should be generated at a vibration frequency of 226 Hz but vibration power of about 4.5 Grms is generated due to a matter of fabrication, vibration power of about 6.9, 6.5, 6.2 and 7.05 is generated respectively at 222 Hz, 223 Hz, 224 Hz and 225 Hz by virtue of the frequency sweeping even if the vibration power of 4.5 Grms is currently generated at 226 Hz. Hence, a user can always feel satisfactory vibration power.

Figure 7:
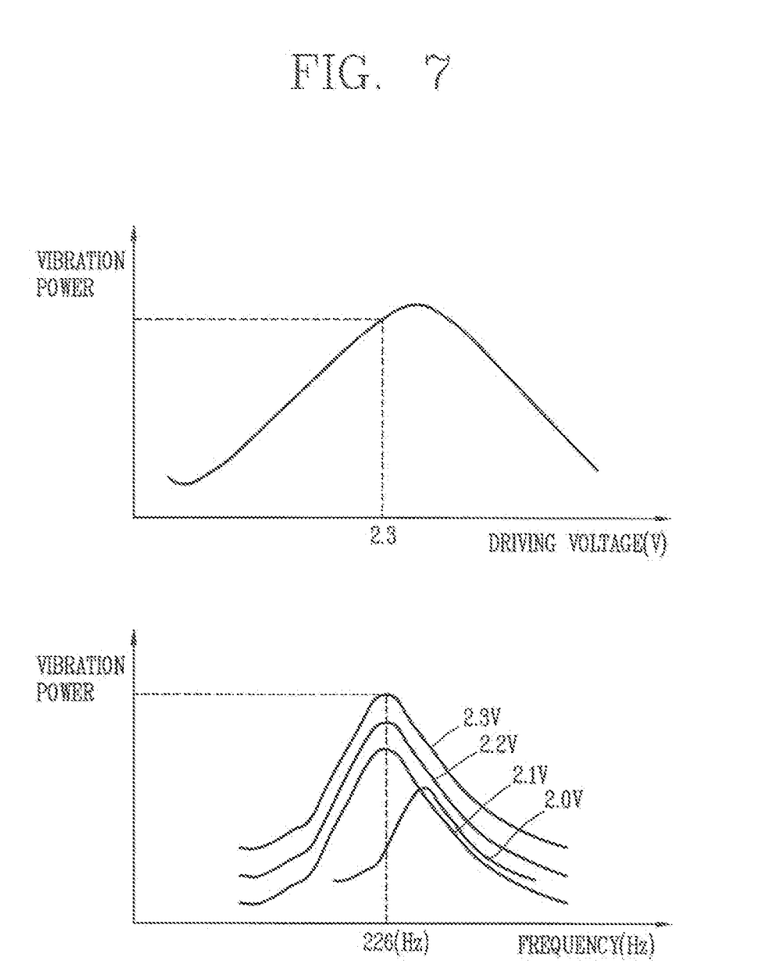
FIG. 7 is a graph showing a relation between vibration and a driving voltage.

FIG. 7 is a graph showing a relation between vibration power and a driving voltage.

In general, when a driving voltage is increased, vibration power is first increased and then starts to be decreased from a specific voltage. Also, as aforementioned, when a vibration frequency of the motor is increased, vibration power is increased and then starts to be decreased from a particular frequency. Hence, with regard to the driving voltage and the frequency with respect to the vibration power, the maximum vibration power is obtained at 226 Hz, and a driving voltage of the vibration motor at that moment is about 2.3V.

In this state, even if the voltage of the vibration motor is dropped down to 2.1V, the vibration power is not greatly decreased and a user can stably feel the vibration. However, the vibration power is drastically dropped when the voltage is less than 2.0V.

Therefore, the present disclosure may decrease the driving voltage of the vibration motor by a specific voltage within a sweep frequency range, thereby reducing current consumption of a battery due to the vibration motor. As one example, the current consumption of the battery is 50~80 mA when the driving voltage is 2.3V. When the driving voltage is dropped to 2.2V, the current consumption of the battery is 45 mA. When the driving voltage is dropped to 2.1V, the current consumption of the battery is 42 mA.

Consequently, as the vibration period of the vibration motor is swept within a preset frequency range and also the driving voltage of the vibration motor is dropped to a specific voltage, stable vibration power can be ensured and current consumption of a battery can be reduced.

Figure 8:
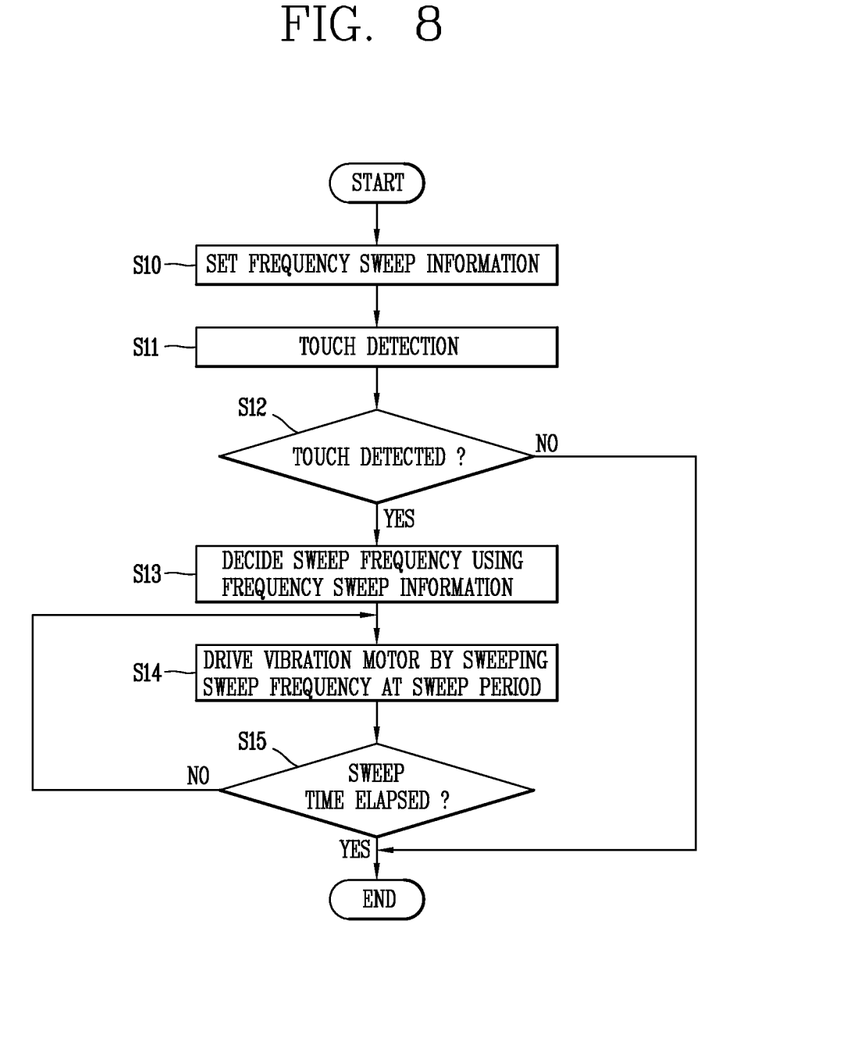
FIG. 8 is a flowchart showing an exemplary embodiment of a vibration power control method for a mobile terminal in accordance with an exemplary embodiment.
Figure 9:
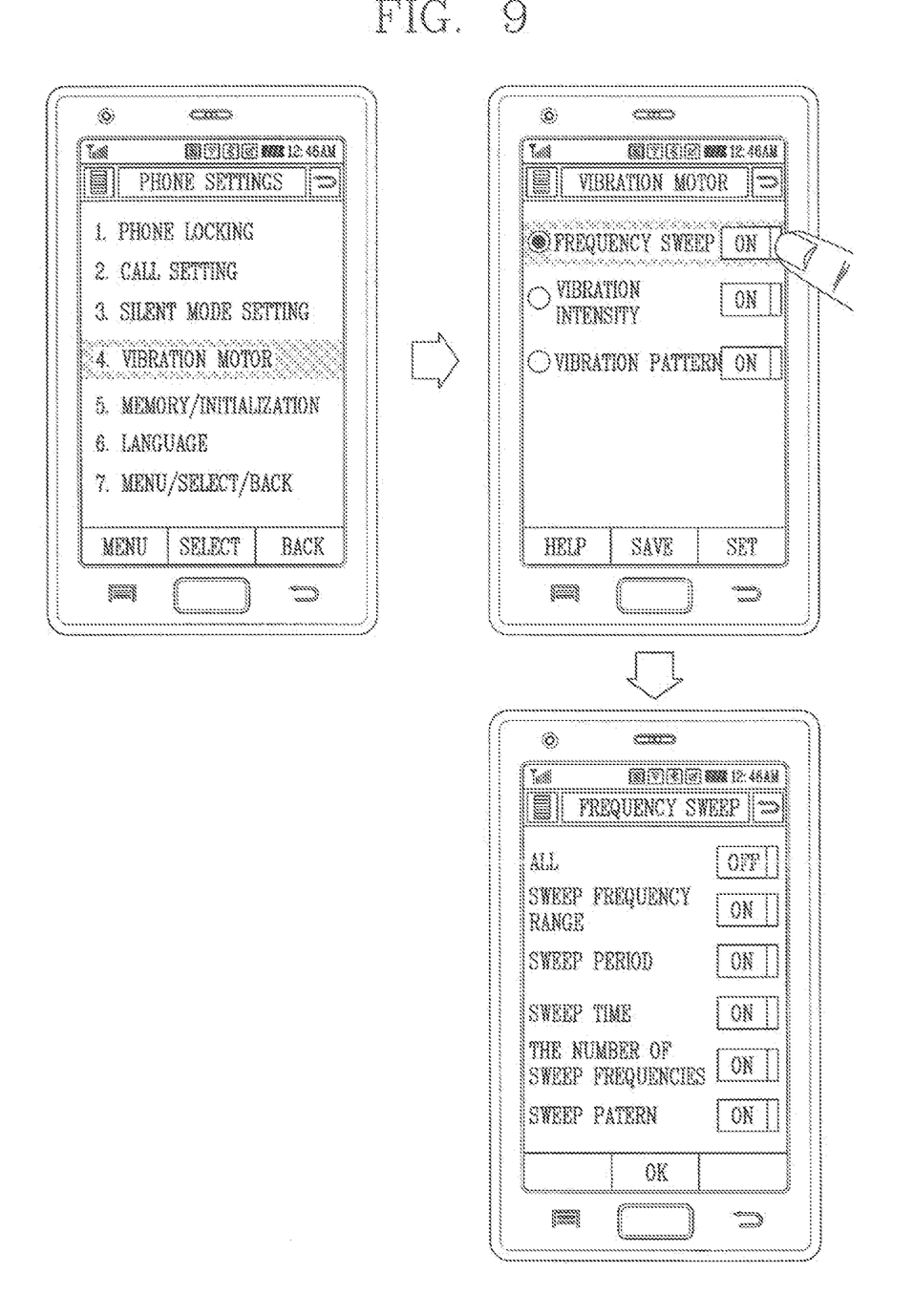
FIG. 9 is a view showing an example of setting frequency sweeping information in a vibration motor menu in accordance with an exemplary embodiment.

FIG. 8 is a flowchart showing an exemplary embodiment of a vibration power control method for a mobile terminal in accordance with an exemplary embodiment, and FIG. 9 is a view showing an example of setting frequency sweep information through a vibration motor menu.

As shown in FIGS. 8 and 9, after selecting a vibration motor menu from phone settings, a user may set a frequency sweep item to "On" in the vibration motor menu. In the On-state of the frequency sweep item, a frequency sweep mode is run in response to touch detection.

When the frequency sweep item is activated, the controller 180 may display a screen to set frequency sweep information.

When detailed items of the frequency sweep are all activated, the controller 180 may automatically set frequency sweep information based on a pre-stored table in the memory 160 according to a type of a vibration motor currently mounted in the mobile terminal (default frequency sweep information) (S10). The frequency sweep information may include a sweep frequency range, a sweep period, a sweep time, the number of sweep frequencies and a sweep pattern.

The number of sweep frequencies defines an interval that sweep frequencies are swept within the sweep frequency range. For example, when the number of sweep frequencies is set to 5 in a state that the frequency range is set to 222 Hz~226 Hz, the sweep frequencies are increased by 1 Hz from 222 Hz. The sweep pattern indicates a pattern to sweep the decided sweep frequencies. The present disclosure may sweep the sweep frequencies in the order of frequency sizes or vibration intensities, or in an alternating manner.

On the other hand, the user may individually set the frequency sweep items other than activating all of the items. Here, the controller 180 may decide and provide only the sweep frequency range based on a pre-stored table according to a type of vibration motor, or decide and provide the sweep frequency range based on a fixed frequency, which is set during fabrication, when no pre-stored table is appeared. That is, since a vibration frequency fixed during fabrication is set to an optimal operational frequency for the corresponding vibration motor, a peak of vibration power theoretically appears near the corresponding fixed frequency. Hence, the controller 180 may automatically set one sweep frequency based on the preset fixed frequency or provide a user with at least one sweep frequency for user selection.

Once the sweep frequency range is set, the user may selectively set at least one of a sweep period, a sweep time, the number of sweep frequencies and a sweep pattern. The vibration power can be adjusted more accurately (stably) when the sweep period is shorter, when the sweep time is longer and when the number of sweep frequencies is greater. Especially, the sweep period and the sweep time may be differently set depending on a task (text, web surfing) displayed on the display unit 151.

Afterwards, when the controller 180 detects a specific user touch input on the screen of the display unit 151 (S11, S12), the controller 180 may decide at least one sweep frequency using the set frequency sweep information (S13). The at least one sweep frequency may be decided by dividing the sweep frequency range by the set number of sweep frequencies.

Accordingly, the controller 180 may repetitively sweep the decided sweep frequency at the sweep period set in the frequency sweep information for the set sweep time according to the sweep pattern, thereby driving the vibration motor (S14, S15).

On the contrary, when the user touch input is not detected, an idle state or an operating state displayed on the current screen is maintained.

Hence, the user can always feel the optimal vibration in response to the touch input by virtue of the frequency sweeping.

Figure 10:
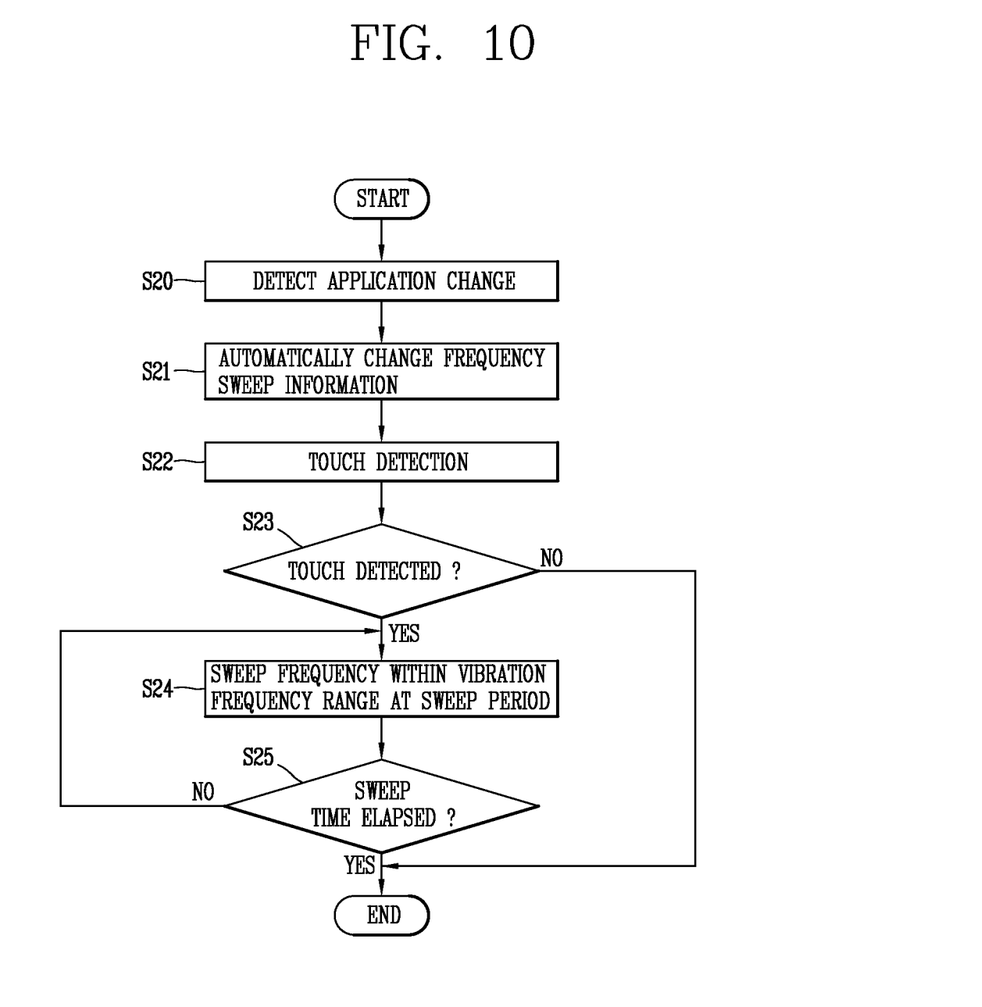
FIG. 10 is a flowchart showing another exemplary embodiment of a vibration power control method for a mobile terminal in accordance with an exemplary embodiment.

FIG. 10 is a flowchart showing another exemplary embodiment of a vibration power control method for a mobile terminal in accordance with an exemplary embodiment.

FIG. 10 shows an example that when a user starts another task while performing one task, at least one of a sweep frequency range, a sweep period and a sweep time is changed to change vibration power according to a type of task performed by the user (a type of application displayed on a screen), thus to provide more stable vibration to the user.

As shown in FIG. 10, when a user converts a mobile terminal into a text input mode while using one application (e.g., web surfing), a user's touch input speed is very fast in the text input mode. In this case, more stable and stronger vibration power should be provided to make a user feel vibration.

Therefore, upon detection of a mode change of the mobile terminal performed by the user (S20), namely, when another application is started, the controller 180 may automatically change the preset frequency sweep information adaptively according to a type of the changed application (S21). That is, the controller 180 may automatically reduce the sweep frequency range down to a range having the best vibration power (e.g., 222 Hz-224 Hz) and reduce a sweep period down to 20 ms, which may allow for more frequency sweeping within a better vibration power range, resulting in an increase in probability of generation of maximum vibration power. As another exemplary embodiment, one of the sweep frequency range and the sweep period may be changed.

Afterwards, when the controller 180 detects a specific user touch input on the screen of the display unit 151 (S22, S23), the controller 180 may repetitively sweep the vibration frequencies of the vibration motor within the changed sweep frequency range at the changed sweep period for the set sweep time (S24, S25).

On the contrary, when the user touch input is not detected, an idle state or an operating state displayed on the current screen is maintained.

Consequently, as a sweep frequency range and/or a sweep period are automatically changed according to the change in an application displayed on a screen, a user can always feel optimal vibration in response to a touch input.

For the sake of explanation, the linear motor has been described as an example, but the present disclosure may alternatively be applied to other types of motors (coin motor, brush motor and pan motor). In this specification, the vibration frequency and the operational frequency of the vibration motor are used as the same meaning.

As described above, as a vibration frequency of a vibration motor can be swept at a preset sweep period within a preset sweep frequency range exhibiting the best vibration power of the vibration motor in a mobile terminal, the vibration power of the vibration motor can always maintain the optimal state. Also, the sweep frequency range and the sweep period can be adaptively changed according to a type of application displayed on a screen, thereby stably maintaining vibration in response to the change in the application.

Furthermore, when the vibration frequency of the vibration motor is swept at the sweep period within the sweep frequency range, a driving voltage of the vibration motor may be reduced down to a specific voltage, resulting in reduction of battery current consumption.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vibration control method for a mobile terminal, the method comprising:
   displaying a setting menu comprising a sweep frequency range, a sweep period, and a sweep time, wherein all items of the setting menu are individually selectable as being either activated or inactivated via user input received at the mobile terminal, wherein when respective items of the setting menu are selected as inactivated, preset values are used for the sweep frequency range, the sweep period, and the sweep time, and when respective items of the setting menu are selected as activated, user-selectable values are used for the sweep frequency range, the sweep period, and the sweep time;
   setting first frequency sweep information for a first application comprising a text message writing function according to the present value or the user-selectable value of each of the sweep frequency range, the sweep period, and the sweep time based on the activated or the inactivated status of such items of the setting menu;
   setting second frequency sweep information for a second application comprising an internet browser function according to the present value or the user-selectable value of each of the sweep frequency range, the sweep period, and the sweep time based on the activated or the inactivated status of such items of the setting menu, wherein the setting of the first frequency sweep information is different than the setting of the second frequency sweep information;
   displaying the first application on a display of the mobile terminal;
   driving a vibration motor according to the first frequency sweep information when a touch is received at the display while the first application is displayed;
   displaying the second application on the display of the mobile terminal;
   automatically changing frequency sweep information used to drive the vibration motor from the first frequency sweep information to the second frequency sweep information upon execution of the second application; and
   driving the vibration motor according to the second frequency sweep information when a touch is received at the display while the second application is displayed.

2. The method of claim 1, wherein the vibration motor comprises at least a coin motor, a brush motor, a linear motor or a pan motor.

3. The method of claim 1 further comprising:
   automatically determining the preset values of the first frequency sweep information and the second frequency sweep information based on a stored table according to a type of the vibration motor.

4. The method of claim 1 further comprising:
   dropping a driving voltage of the vibration motor by a preset level while the vibration motor is driven according to the first frequency sweep information and the second frequency sweep information.

5. A mobile terminal comprising:
   a vibration motor;
   a display; and
   a controller configured to:
      cause displaying on the display a setting menu comprising a sweep frequency range, a sweep period, and a sweep time, wherein all items of the setting menu are individually selectable as being either activated or inactivated via user input received at the mobile terminal, wherein when respective items of the setting menu are selected as inactivated, preset values are used for the sweep frequency range, the sweep period, and the sweep time, and when respective items of the setting menu are selected as activated, user-selectable values are used for the sweep frequency range, the sweep period, and the sweep time;

set first frequency sweep information for a first application comprising a text message writing function according to the present value or the user-selectable value of each of the sweep frequency range, the sweep period, and the sweep time based on the activated or the inactivated status of such items of the setting menu;

set second frequency sweep information for a second application comprising an internet browser function according to the present value or the user-selectable value of each of the sweep frequency range, the sweep period, and the sweep time based on the activated or the inactivated status of such items of the setting menu, wherein the setting of the first frequency sweep information is different than the setting of the second frequency sweep information;

cause displaying on the display the first application;

drive the vibration motor according to the first frequency sweep information when a touch is received at the display while the first application is displayed;

cause displaying on the display the second application on the display of the mobile terminal;

automatically change frequency sweep information used to drive the vibration motor from the first frequency sweep information to the second frequency sweep information upon execution of the second application; and drive the vibration motor according to the second frequency sweep information when a touch is received at the display while the second application is displayed.

6. The mobile terminal of claim 5, wherein the vibration motor comprises at least a coin motor, a brush motor, a linear motor or a pan motor.

7. The mobile terminal of claim 5, wherein the controller is further configured to:

automatically determine the preset values of the first frequency sweep information and the second frequency sweep information based on a stored table according to a type of the vibration motor.

8. The mobile terminal of claim 5, wherein the controller is further configured to:

drop a driving voltage of the vibration motor by a preset level while the vibration motor is driven according to the first frequency sweep information and the second frequency sweep information.

\* \* \* \* \*